UNITED STATES PATENT OFFICE.

JOSEF PATEK, OF KARLSHORST, NEAR BERLIN, GERMANY.

METHOD OF MANUFACTURING HYDROGEN PEROXID.

1,234,380. Specification of Letters Patent. Patented July 24, 1917.

No Drawing. Application filed March 4, 1914. Serial No. 822,488.

*To all whom it may concern:*

Be it known that I, JOSEF PATEK, subject of the Emperor of Austria, residing at 53 Auguste-Victoria strasse, Karlshorst, near Berlin, Germany, have invented certain new and useful Improvements in Methods of Manufacturing Hydrogen Peroxid, of which the following is a specification.

This invention relates to a method of commercially obtaining hydrogen peroxid by the distillation of persulfates. In the employment of persulfuric acid for the manufacture of hydrogen peroxid two ways have hitherto been suggested. In the older method, electrolytically prepared solutions of free persulfuric acid are distilled; in the later method as is, for example, disclosed in the German patent specifications Nos. 241702 and 256148 and also in the Austrian patent specification No. 34775, one proceeds from the persulfates which are decomposed by sulfuric acid and the hydrogen peroxid solutions then either mechanically separated without distillation from the remaining bisulfates or as in the second mentioned patent the resulting hydrogen peroxid obtained by distillation. The older method which commences with free electrolytically prepared persulfuric acid enables very easy continual work and especially a combination of the manufacturing process with the decomposing process of the persulfuric acid to a continuous method. In this case the sulfuric acid to be oxidized can be supplied to one side of the electrolytic cell and the finished persulfuric acid leaving at the other side can be directly supplied to the distilling apparatus from which the remaining sulfuric acid then returns in a circuit to the electrolytic cell. This method has thus in spite of the drawbacks attached to it (the difficult maintenance of the persulfuric acid) the great advantage of being easily and conveniently carried out commercially.

The method of obtaining hydrogen peroxid from solid persulfate renders the carrying out of a continuous process on a commercial scale considerably more difficult. Even the steps in the manufacture of the solid persulfates in the cell makes the carrying out of a continuous combination process almost impossible. In the manufacture of solid persulfates of which only the difficultly soluble potassium persulfate has been suggested, the precipitated salt must be from time to time removed from the electrolyzer and freed from the adhering sulfuric acid by centrifugal action. It has also been found in practice that the electrolysis must be interrupted from time to time because during the process the persulfate crystals readily settle on the electrodes and cooling worms and in consequence thereof, in order to protect the thin platinum foil of the electrodes from being torn and to maintain the cooling action of the worm, the salt must be removed, which is only practically possible by interrupting the operation.

It is, also necessary, as is set forth, for example, in the German Patent No. 241702 (page 2, line 22 *et seq.*) to purify the persulfate by recrystallization in order to free it from the inclosed mechanical impurities through whose surface action the resulting hydrogen peroxid would be considerably decomposed, for, as Wolfenstein and others have ascertained, solid bodies of all kinds act during the distillation of hydrogen peroxid solutions as catalytic agents (*Gmelin-Kraut, Handbuch* I (1) 7th edition, page 131). This preparation of the potassium persulfate for the decomposition necessitates not only a considerable expenditure of labor, but is also accompanied with oxygen losses during the recrystallization which are not inconsiderable, even in the case of the difficultly soluble potassium persulfate, but which would appear to render the more soluble persulfate, such as the ammonium or sodium persulfate, entirely unsuitable for this method of manufacturing hydrogen peroxid.

Thus in the manufacture of the difficultly soluble potassium persulfate in the cell, as well as in the necessary preparation of the persulfate for the decomposition, there is a practically unavoidable obstacle for a continuous method.

While the employment of solid potassium persulfate or during its decomposition with highly concentrated sulfuric acid, mixture rich in oxygen result which can be separated or distilled, nevertheless it must, on the other hand, be remembered that these mixtures rich in oxygen do not of themselves occasion the yield of hydrogen peroxid, since in addition to the reactions which are given in the German patent specification No. 241702 the reactions between the Caro acid and the hydrogen peroxid formed according to the equation $$H_2SO_5 + H_2O_2 = H_2SO_4 + H_2O + 2O$$

must also be considered, a reaction which during the concentrated work, as is proposed, is of great importance since with the concentration of the sulfuric acid the speed of formation of the Caro acid also increases (*Gmelin-Kraut* I (1) 7th ed. page. 567 and 569).

The inventor has endeavored to solve the problem of obtaining a method which while utilizing persulfates offers the easy operation of the method with free persulfuric acid, that is, it combines the advantages of both processes, which consists in commencing with the comparatively stable persulfates, on the one hand, and creating a continuous circulating process on the other hand. The essential feature of the present invention consists in commencing with persulfate solutions instead of solid persulfates and in the use of the easily soluble persulfates instead of the difficultly soluble persalts, as the potassium salts. The use of solutions of easily soluble persalts, among which ammonium persulfate is of chief importance, offers in the first place for the continuity of the operation the great advantage that neither during the electrolytic manufacture of the salt, nor during its decomposition, do precipitations of salts of any kind take place and a purification by recrystallization is dispensed with, since the solid bodies to be removed by this process can be removed by simple filtration.

According to what has been published, especially as to ammonium persulfate, it was to be assumed that this salt owing to its properties would not be suitable for the manufacture of hydrogen peroxid. The very fact that the persulfuric acid ion is loosely combined with the easily oxidizable ammonium group led one to assume that this persulfate would behave differently from the more stable persulfates of the fixed alkalis and especially of potassium. In an extensive work Levy and Migliorini have studied the behavior of ammonium persulfate in this direction and have ascertained that the ammonia of the ammonium persulfate solution oxidizes at temperatures between 50° C. and 100° C. for the greater part to nitric acid, immaterial of whether the solution is neutral, alkaline or slightly acid (*Zentralblatt* 1908, II, page 929). Those skilled in the art would assume therefrom that the economical utilization of the ammonium persulfate as the fundamental material for the manufacture of hydrogen peroxid was without prospect.

It was therefore still more surprising that the distillation of mixtures of ammonium persulfate solutions and sulfuric acid led to good and even very good yields of hydrogen peroxid. The oxygen actively present in the persulfate can be almost quantitatively reobtained as hydrogen peroxid. The method is carried out by distilling the mixtures as rapidly as possible and preferably in a vacuum and taking care that the resulting hydrogen peroxid is rapidly removed from the distilling chamber. It may be left undecided as to the reasons of this apparent contradiction. It is not improbable that the experimental conditions of Levy and Migliorini were different and that they may have, for example, allowed the mixtures to stand for a long time at the given temperatures, while the applicant takes care to rapidly remove the hydrogen peroxid formed. It is a fact that in the operation described only slight oxidizing of the ammonia could be observed. It is possible, by the use of easily soluble persulfates, particularly ammonium persulfate, to carry out a continuous method of manufacturing hydrogen peroxid such as was otherwise only possible with the free persulfuric acid. In this case, however, at the same time those drawbacks which resulted in the employment of free persulfuric acid in the continuous method are obviated. Thus the advantages of the one process are combined with the advantages of the other process while obviating the corresponding disadvantages.

An example of my method consists in oxidizing ammonium bisulfate solution in an electrolytic apparatus to ammonium persulfate solution and distilling this with sulfuric acid. The solution of bisulfate thereby remaining is again supplied to the electrolyzer without the solid salt being separated as in the case of potassium bisulfate. As compared with the old continuous method with the use of free persulfuric acid, the method with the formation and decomposition of ammonium persulfate is already in so far more economically advantageous that, as is known, the manufacture of the ammonium persulfate in the cell is cheaper than that of the free persulfuric acid. While the formation or the durability of the persulfuric acid in the cell at temperatures over 10° C. rapidly diminishes and one must therefore provide for an energetic cooling, in the manufacture of ammonium persulfate this costly cooling may be entirely avoided. As Levy has ascertained, the yield of ammonium persulfate even up to 30° C. is still independent of the temperature (*Zeitschrift für Elektrochemie* 1903, page 427). A simple water cooling is thus sufficient to render the current heat non-dangerous. The current yield is also very great in the manufacture of ammonium persulfate and can be raised to 80% as compared with 40% of the potassium persulfate and 50% in the case of the persulfuric acid. Moreover, while one in the case of persulfuric acid must work with diaphragms and employ an electric tension of 7.3 volts, the electrolysis of ammonium persulfate is carried out without diaphragms and at a tension of 5.9 volts. These economically favorable conditions therefore appear to show that the ammonium persulfate hitherto not proposed for the manufacture of hydrogen peroxid and according to previous literature apparently entirely unsuitable therefor, is particularly suitable as the commencing material and the more so when it is desired to produce a continuous method.

I claim:
1. A process for the production of hydrogen peroxid which comprises adding sulfuric acid to a solution of ammonium persulfate and rapidly separating the peroxid of hydrogen from the solution.
2. A process for the production of hydrogen peroxid which comprises adding sulfuric acid to a solution of ammonium persulfate and rapidly separating the peroxid of hydrogen from the solution by distillation.

In testimony whereof I have affixed my signature in presence of two witnesses.

JOSEF PATEK.

Witnesses:
WOLDEMAR HAUPT,
HENRY HASPER.